(12) United States Patent
Luhrs et al.

(10) Patent No.: US 8,419,998 B2
(45) Date of Patent: Apr. 16, 2013

(54) PROCESS FOR MAKING HOLLOW CARBON SPHERES

(75) Inventors: Claudia C. Luhrs, Rio Rancho, NM (US); Jonathan Phillips, Rio Rancho, NM (US); Monique N. Richard, Ann Arbor, MI (US); Angela Michelle Knapp, Ann Arbor, MI (US)

(73) Assignees: Toyota Motor Engineering & Manufacturing North America, Inc., Erlanger, KY (US); The Regents of the University of New Mexico, Albuquerque, NM (US); Los Alamos National Lab, Los Alamos, NM (US)

( * ) Notice: Subject to any disclaimer, the term of this patent is extended or adjusted under 35 U.S.C. 154(b) by 21 days.

(21) Appl. No.: 13/080,738

(22) Filed: Apr. 6, 2011

(65) Prior Publication Data

US 2011/0180513 A1     Jul. 28, 2011

Related U.S. Application Data

(62) Division of application No. 12/391,794, filed on Feb. 24, 2009, now abandoned.

(51) Int. Cl.
*H05H 1/26*     (2006.01)

(52) U.S. Cl.
USPC ............ 264/483; 264/7; 264/12; 264/489; 264/491

(58) Field of Classification Search .............. 264/5, 7, 264/12, 405, 483, 489, 491
See application file for complete search history.

(56) References Cited

U.S. PATENT DOCUMENTS

| | | | |
|---|---|---|---|
| 5,593,740 A * | 1/1997 | Strumban et al. ............. 427/577 |
| 6,841,509 B1 | 1/2005 | Hwang et al. | |
| 2003/0026985 A1 * | 2/2003 | Greiner et al. ................ 428/373 |
| 2005/0032635 A1 | 2/2005 | Yu et al. | |
| 2005/0271734 A1 | 12/2005 | Dennis et al. | |
| 2007/0106363 A1 * | 5/2007 | Weber .......................... 623/1.11 |
| 2007/0207081 A1 | 9/2007 | Takikawa et al. | |
| 2008/0027149 A1 | 1/2008 | Aikyou et al. | |
| 2008/0087314 A1 | 4/2008 | Xiao et al. | |
| 2009/0082474 A1 | 3/2009 | Zhang et al. | |

FOREIGN PATENT DOCUMENTS

| EP | 1959508 A1 | 8/2008 |
|---|---|---|
| WO | WO-2006/063506 A1 | 6/2006 |

OTHER PUBLICATIONS

Crystalline Carbon Hollow Spheres, Crystalline Carbon-SnO2 Hollow Spheres and Crystalline SnO2 Hollow Spheres: Synthesis and Performance in Reversible Li-Ion Storage, Wang Yong et al. Feb. 10, 2006.*

Yujie Xiong et al.; A Novel Approach to Carbon Hollow Spheres and Vessels From CCl4 At Low Temperatures; Chem.Commun., 2003; pp. 904-905.

(Continued)

*Primary Examiner* — Joseph Del Sole
*Assistant Examiner* — David N Brown, II
(74) *Attorney, Agent, or Firm* — Gifford, Krass, Sprinkle, Anderson & Citkowski, P.C.

(57) ABSTRACT

A hollow carbon sphere having a carbon shell and an inner core is disclosed. The hollow carbon sphere has a total volume that is equal to a volume of the carbon shell plus an inner free volume within the carbon shell. The inner free volume is at least 25% of the total volume. In some instances, a nominal diameter of the hollow carbon sphere is between 10 and 180 nanometers.

7 Claims, 5 Drawing Sheets

OTHER PUBLICATIONS

Wu Zhang; Large Scale Synthesis of Carbon Hollow Spheres From Metal Zinc Powder and Ethanol; Chemistry Letters vol. 33., No. 10 (2004).

Fabing Su; Hollow Carbon Spheres With a Controllable Shell Structure; Journals of Materials Chemistry 2006; pp. 4413-4419.

Zhen-Xue Liu et al.; Nano-sized Carbon Hollow Spheres for Abatement of Ethylene; Topics in Catalysis; vol. 39. Nos. 3-4; Oct. 2006; pp. 221-226.

Chun-Yi Chang-Chien et al; Synthesis of Carbon and Silica Hollow Spheres with Mesoporous Shells using Polyethylene Oxide/Phenol Formaldehyde Polymer Blend; Eur. J. Inorg. Chem. 2007; pp. 3798-3804.

Zhenhai Wen et al; Hollow Carbon Spheres with Wide Size Distribution as Anode Catalyst Support for Direct Methanol Fuel Cells; ScienceDirect; Electrochemistry Communications 9; (2007) 1867-1872.

Feng Li et al; CoO-loaded Graphitable Carbon Hollow Spheres as Anode Materials for Lithium-ion Battery; Journal of Power Sources 177 (2008) pp. 546-552.

Shujian Ding et al; Porous Carbon and Carbon Composite Hollow Spheres; Colloid Polym Sci (2008).

Purkayastha Arup et al., Advanced materials, 2006, vol. 18, pp. 2958-2963.

* cited by examiner

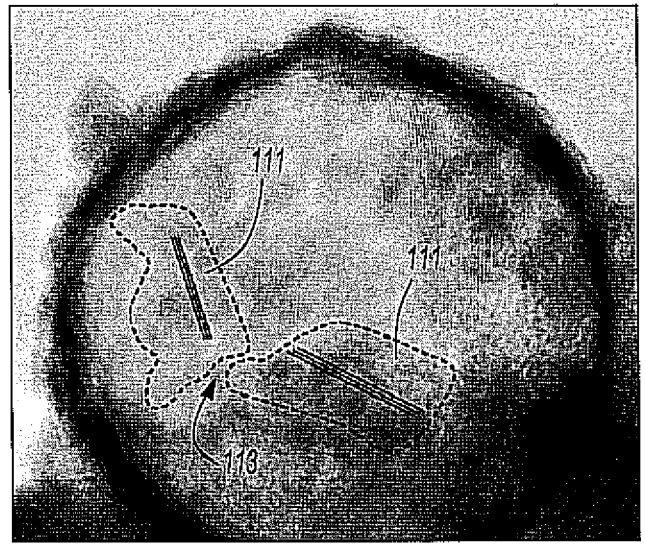
Fig-4
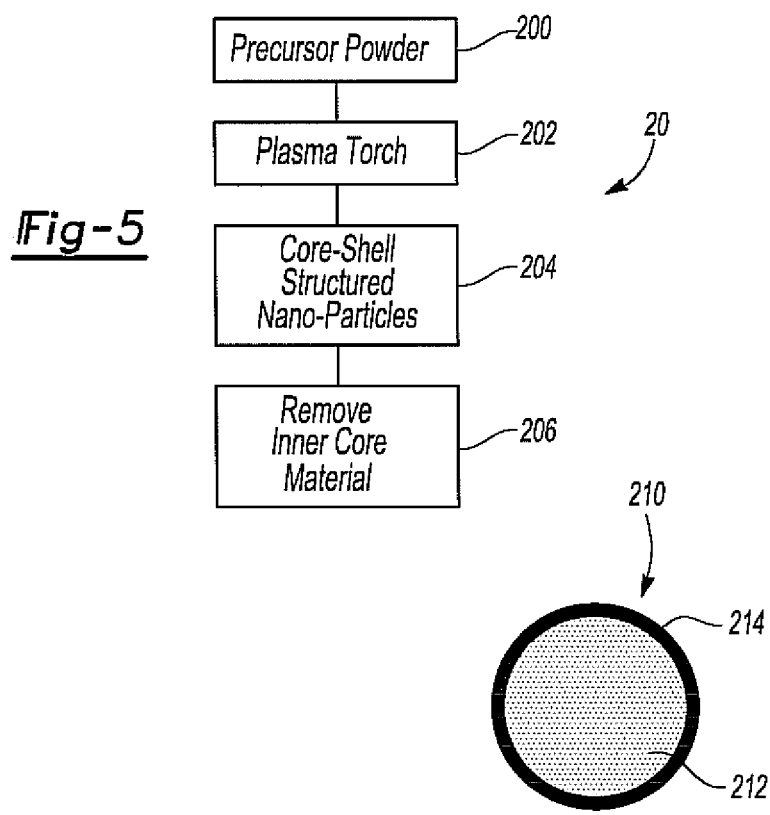
Fig-5
Fig-7

US 8,419,998 B2

PROCESS FOR MAKING HOLLOW CARBON SPHERES

RELATED APPLICATION

This application is a divisional application that claims priority of U.S. patent application Ser. No. 12/391,794 filed Feb. 24, 2009 and having the same title, the entirety of which is incorporated herein by reference.

GOVERNMENT INTEREST

This invention was made with government support under Contract No. DE-AC52-06NA25396 ordered by the U.S. Department of Energy. The government has certain rights in the invention.

FIELD OF THE INVENTION

The present invention relates to a hollow carbon sphere, and in particular to a hollow carbon sphere having a large inner free volume.

BACKGROUND OF THE INVENTION

Hollow carbon spheres are known. For example, Xiong et al.[1] have reported hollow carbon spheres having diameters between 400 to 600 nanometers made from $CCl_4$ at temperatures between 190 and 230° C., Zhang et al.[2] have reported hollow carbon spheres with a nominal diameter of 400 nanometers and made using metal zinc powder and ethanol, Su et al.[3] have reported hollow carbon spheres made by coating silica spheres with carbon, and Win et al.[4] have reported hollow carbon spheres with diameters between 300 nanometers and 1 micron.

Regarding hollow carbon spheres having diameters of less than 200 nanometers, U.S. Pat. No. 7,156,958 discloses a method for producing hollow carbon nanocapsules with a diameter between 3 to 60 nanometers and U.S. Patent Application Publication Nos. 2005/0079354 and 2007/0220873 disclose hollow carbon spheres with diameters less than 20 nanometers. However, these references do not disclose the size of an inner core or cavity within the hollow carbon structures. In contrast, U.S. Patent Application Publication No. 2007/0080054 does disclose an inner cavity of 5 nanometers within hollow carbon nanoparticles with a diameter of 20 nanometers and Phillips et al.[5,6] reported producing hollow graphite particles as small as 30 nm in diameter.

As such, hollow carbon spheres having diameters of less than 200 nanometers have been disclosed, however hollow carbon spheres within this size range with a relatively large inner free volume have not. Therefore, a hollow carbon sphere having a diameter of less than 200 nanometers with a relatively large inner free volume would be desirable.

SUMMARY OF THE INVENTION

A hollow carbon sphere having a carbon shell and an inner free volume is disclosed. The hollow carbon sphere has a total volume that is equal to a volume of the carbon shell plus an inner free volume within the carbon shell. The inner free volume is at least 25% of the total volume. In some instances, a nominal diameter of the hollow carbon sphere is between 10 and 180 nanometers.

The carbon shell can have a pathway therethrough, for example a pathway in the form of porosity and/or a pathway in the form of a misfit region between two adjacent carbon grains that form at least part of the carbon shell. The pathway can afford for a material to be encapsulated within the hollow carbon sphere, for example an electro-active material, a catalytic material and/or a biologically active. In addition, the catalytic material can be located on a surface of the carbon shell, and in some instances be on an outer surface of the carbon shell. The catalytic material can include materials such as platinum, palladium, rhodium, rhenium, iron, nickel, cobalt, silver, gold and alloys thereof.

A process for making hollow carbon spheres is also disclosed, the process including supplying a sacrificial core material which carbon will encapsulate, thereby forming a carbon shell. Thereafter, the sacrificial material is removed from within the carbon shell in order to produce the hollow carbon sphere. The hollow carbon sphere has an inner volume that is at least 25% of the total volume of the sphere.

The depositing of carbon onto the sacrificial material can include depositing by condensation of carbon atoms. For example, carbon can be vaporized within a plasma to form carbon vapor, followed by rearrangement and/or deposition of the carbon atoms onto the sacrificial material. In addition, the deposition of carbon onto the sacrificial core material can include depositing by chemical vapor deposition, depositing by laser ablation, depositing by electric arc discharge and depositing by low temperature solvation. The sacrificial material can be removed from within the carbon shell by acidic dissolution or by alkaline dissolution.

BRIEF DESCRIPTION OF THE DRAWINGS

FIG. 4 is a TEM image showing a potential pathway through a carbon shell;

FIG. 5 is a schematic diagram of a process for making hollow carbon spheres;

FIG. 7 is a schematic illustration of a carbon outer shell on a sacrificial material;

DETAILED DESCRIPTION OF THE INVENTION

Figure 1:
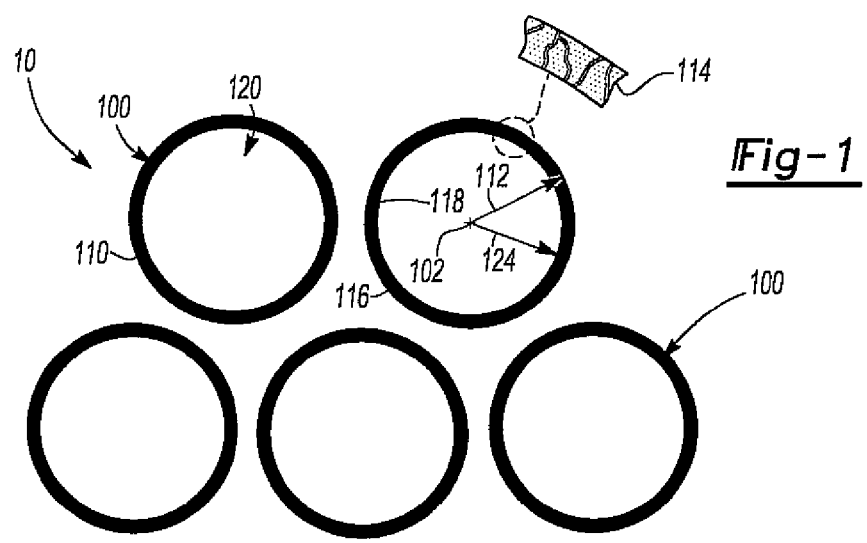
FIG. 1 is a schematic illustration of a plurality of hollow carbon spheres according to an embodiment of the present invention.

The present invention discloses a hollow carbon sphere having a carbon shell with an inner free volume. In addition, a process for making the hollow carbon sphere is disclosed. The hollow carbon sphere can be used to encapsulate a material therewithin and/or to support a catalytic material. As such, the hollow carbon sphere has utility as a battery material, a catalytic support structure material and the like. In addition, the process has utility for making hollow carbon spheres.

The hollow carbon sphere has a total volume that is equal to a volume of the carbon shell plus a volume of the inner free space within the carbon shell. The inner free volume is at least 25% of the total volume. In some instances, the inner free volume is at least 50% of the total volume, while in other instances, the inner free volume is at least 75% of the total volume, and in still other instances the inner volume is at least 90% of the total volume.

A nominal diameter of the hollow carbon sphere can be between 10 and 180 nanometers, and in some instances is between 50 and 150 nanometers. In still other instances, the nominal diameter of the hollow carbon sphere is between 80 and 120 nanometers. The carbon shell can have a nominal thickness that is between 2 to 30 nanometers, and in some instances is between 5 and 20 nanometers. In still other instances, the nominal thickness of the carbon shell is between 7 and 10 nanometers.

The carbon shell can have a pathway therethrough that affords for the passing of material through the shell and into or out of the carbon sphere. The pathway can be in the form of porosity and/or a misfit region between two adjacent carbon grains wherein the diffusivity of atoms and/or molecules is enhanced.

The hollow carbon spheres can be used to encapsulate an electro-active material therein. The electro-active material can be a material that alloys with lithium and/or a material that contains lithium. The hollow carbon sphere can also serve as a support structure for a catalytic material, the catalytic material being on a surface of the carbon shell. The surface can be an outer surface of the carbon shell, or in the alternative an inner surface of the carbon shell. The catalytic material can be a material such as platinum, palladium, rhodium, rhenium, iron, nickel, cobalt, silver, gold and/or alloys thereof.

In addition, hollow carbon sphere can be used for drug delivery by having a biologically active material within and/or on the carbon shell. For example and for illustrative purposes only, the hollow carbon sphere can include a biologically active material or molecule therewithin to be delivered and optionally a polymer that is covalently bound to the biologically active molecule, for example, an antibody or antibody fragment. The biologically active molecule can be located within and/or on the outside surface of the hollow carbon sphere. The biologically active molecule can be any molecule used to treat a patient, illustratively including a protein, carbohydrate or polysaccharide, nucleic acid, lipid, a combination thereof, or a synthetic molecule, including organic and inorganic materials.

In some instances, the hollow carbon spheres can be used as injectable particles, the hollow carbon spheres having a substance to be delivered and a copolymer of poly(alkylene glycol) with poly(lactic-co-glycolic acid), poly(lactic-acid), poly(glycolic acid), or polyanhydride, wherein the poly(alkylene glycol) is covalently bound to an antibody or antibody fragment. As such, the hollow carbon spheres can be used to release over long periods of time highly active and effective drugs, such as anticancer drugs, that produce significant side effects when administered systemically. It is appreciated that the controlled release generally decreases the toxic side effects associated with systemic administration of the non-encapsulated drug. The polymeric matrix can also provide protection of the drugs against degradation in the plasma for drugs with short biological half-lives.

A process for making a hollow carbon sphere can include providing a sacrificial material, depositing carbon onto the sacrificial material in order to form a carbon shell and removing the sacrificial material in order to produce the hollow carbon sphere. The sacrificial material can be any material that is removable from within the carbon shell by acidic dissolution or alkaline dissolution.

In some instances, a precursor in the form of a dry precursor powder, a liquid and/or a vapor of a liquid can be provided, the precursor suspended in an aerosol gas to produce an aerosol containing the precursor. In addition, the aerosol can be passed through a plasma having a hot zone with at least part of the precursors in the aerosol being vaporized. New particles can be created in the hot zone by reorganization of atoms from the precursor, and sometimes atoms from the aerosol gas as well.

The aerosol gas can carry the new particles out of the hot zone and into a plasma afterglow region where extremely rapid cooling occurs. The particles can then be carried into a zone that is near ambient temperature where the particles can be removed from the aerosol gas generally with a filter. Thereafter, acidic dissolution or alkaline dissolution can be used to remove the core material from within the carbon shell.

The hot zone of the plasma can be a region of high electromagnetic energy that can be generated using radio frequency, microwave energy or direct current discharge. The plasma can be a non-oxidizing plasma and in some instances is a low power atmospheric or near-atmospheric pressure plasma with the plasma generated by focusing microwave energy within a coupler.

The aerosol gas can be an inert gas, illustratively including helium, argon and combinations thereof. The process can further include passing a plasma gas in addition to the aerosol through the hot zone of the plasma, the plasma gas also being an inert gas. In some instances, the core material is a lithium alloying material and can contain an element such as tin, silicon, aluminum, germanium, combinations thereof and the like.

Turning now to FIG. 1, an embodiment of a hollow carbon sphere is shown generally at reference numeral 10. The embodiment 10 can include one or more hollow carbon spheres 100, the hollow carbon sphere 100 having a carbon shell 110 and an inner free volume 120. The hollow carbon sphere 100 can include a radius 112 that extends from a center 102 of the sphere to an outer surface 116 of the carbon shell 110. In addition, the hollow carbon sphere 100 can have an inner radius 124 that extends from the center 102 of the sphere to an inner surface 118. As such, the hollow carbon sphere 100 can have a total volume equal to $4/3\pi R_t^3$ wherein $R_t$ is equivalent to the radius 112 as shown in FIG. 1. Likewise, the hollow carbon sphere 100 can have an inner free space volume equal to $4/3\pi R_i^3$ wherein $R_i$ is equal to the inner radius 124 as shown in FIG. 1.

In some instances, the inner free space volume is equal to at least 25% of the total volume for the hollow carbon sphere 100. In other instances, the inner free space volume is at least 50% of the total volume, while in still other instances, the inner free space volume is at least 75% of the total volume. In still yet other instances, the inner free space volume is at least 90% of the total volume.

The carbon shell 110 can have a pathway therethrough. For example and for illustrative purposes only, the pathway can be in the form of porosity 114 as shown in FIG. 1. The porosity 114 can afford for the passing, migration and/or diffusion of atoms and/or molecules through the carbon shell 110. In addition, the pathway can be afforded by a misfit region between adjacent carbon grains that are part of the carbon shell 110. For example, FIG. 4 shows a transmission electron microscopy (TEM) image of a hollow carbon sphere with two adjacent grains 111 having different orientations schematically shown at 113. The grains 111 have lines schematically drawn thereon that corresponding to rows of carbon atoms, thereby illustrating that the two grains 111 do not have the same orientation. As such, it is appreciated that the region 113 located between the two adjacent grains 111 can afford for enhanced diffusivity of atoms and/or molecules therethrough. In this manner, atoms and/or molecules from an acid or alkaline solution can pass through the carbon shell and come into contact with the sacrificial material. Likewise, the sacrificial material that has been dissolved can exit the hollow carbon sphere 100.

Figure 2:
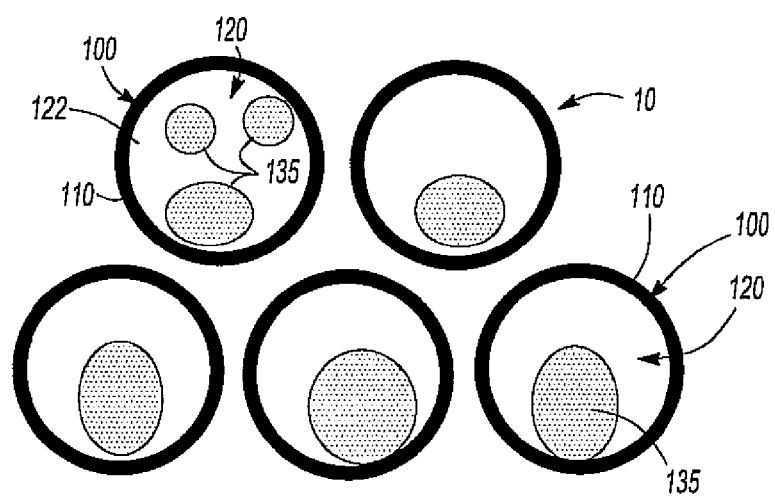
FIG. 2 is a schematic illustration of the embodiment shown in FIG. 1 with an electro-active material within the plurality of hollow carbon spheres.

Turning now to FIG. 2, the hollow carbon sphere 100 can have an electro-active material 135 encapsulated therewithin. The electro-active material 135 can include a lithium alloying material. It is appreciated that the electro-active material 135 is deposited within the hollow carbon sphere 100 by first passing through the pathway described above of the carbon shell 110.

Figure 3:
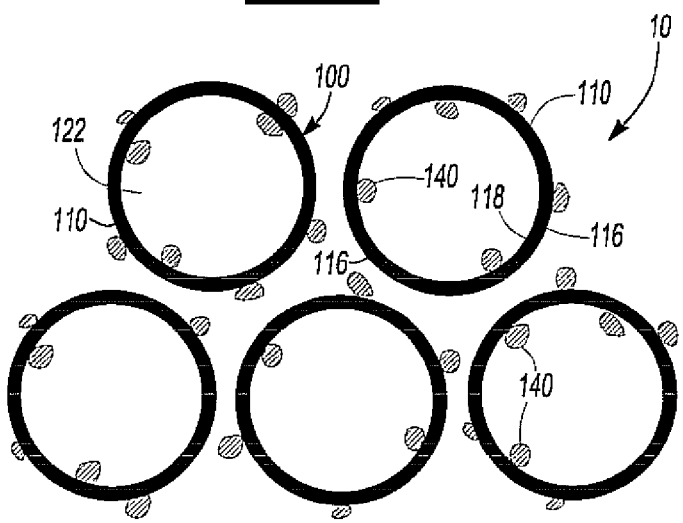
FIG. 3 is a schematic illustration of the embodiment shown in FIG. 1 with catalytic material on a surface of the plurality of hollow carbon spheres.

Looking now at FIG. 3, the hollow carbon sphere 100 has a catalytic material 140 supported by the carbon shell 110. The catalytic material 140 can be present on the outer surface 116 and/or the inner surface 118 of the carbon shell 110. It is appreciated that a biologically active material or molecule can be located within and/or on the carbon shell 110 and thus afford for the hollow carbon sphere to be used for drug delivery.

Turning now to FIG. 5, an embodiment for producing the hollow carbon sphere is shown generally at reference numeral 20. The process 20 includes providing a precursor in the form of a powder, a liquid and/or a vapor of a liquid at step 200 and passing the precursor through a plasma torch at step 202. Upon passing the precursor through the plasma torch at step 202, at least part of a shell material and at least part of a core material that is contained within the precursor is vaporized. The vaporized material then condenses to form a core-shell structured nanoparticle at step 204. Thereafter, the sacrificial material that is within an outer shell is removed and a hollow carbon sphere is produced.

Figure 6:
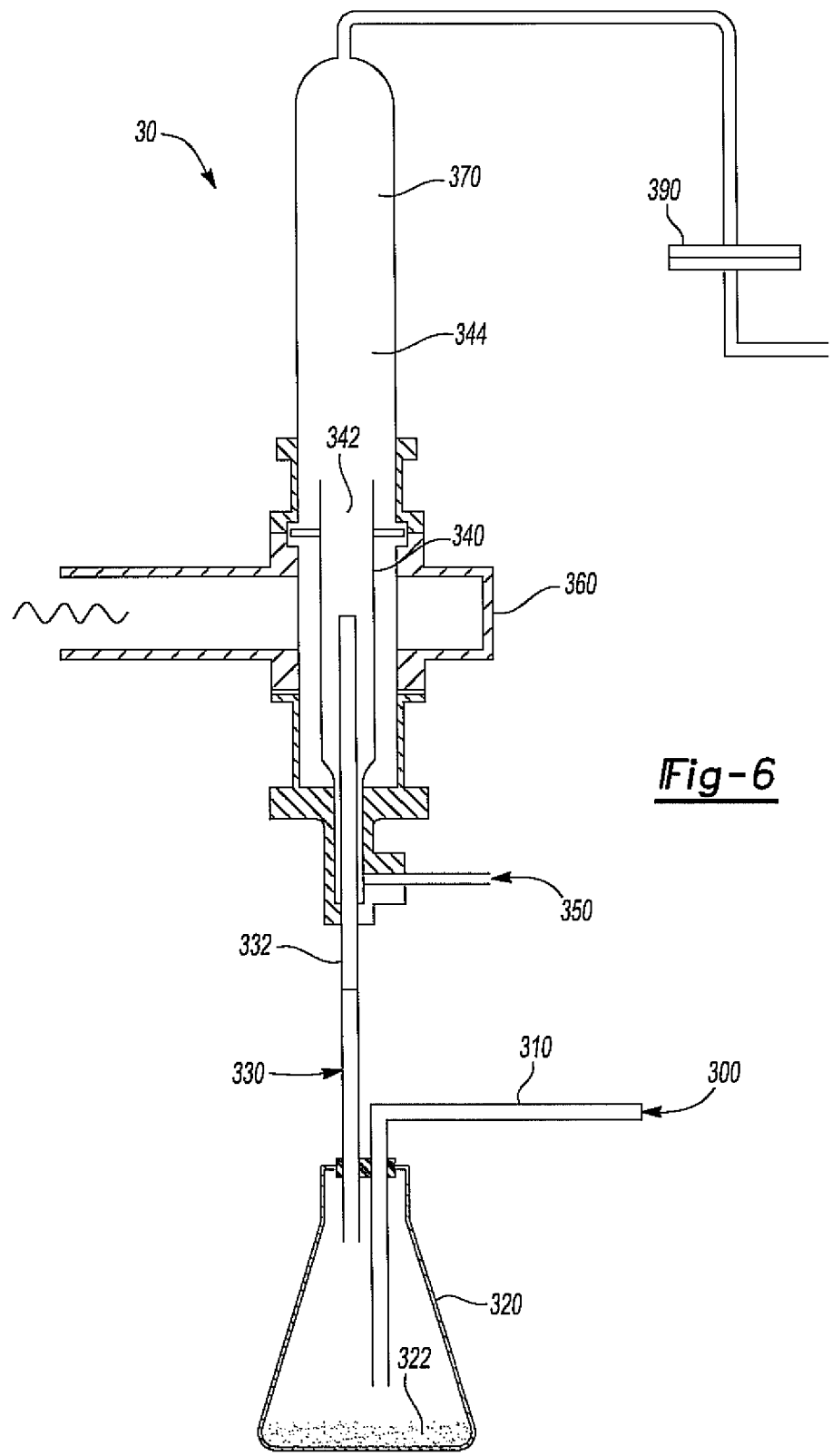
FIG. 6 is a schematic diagram of an apparatus for making a core material encapsulated by carbon.
Figure 8:
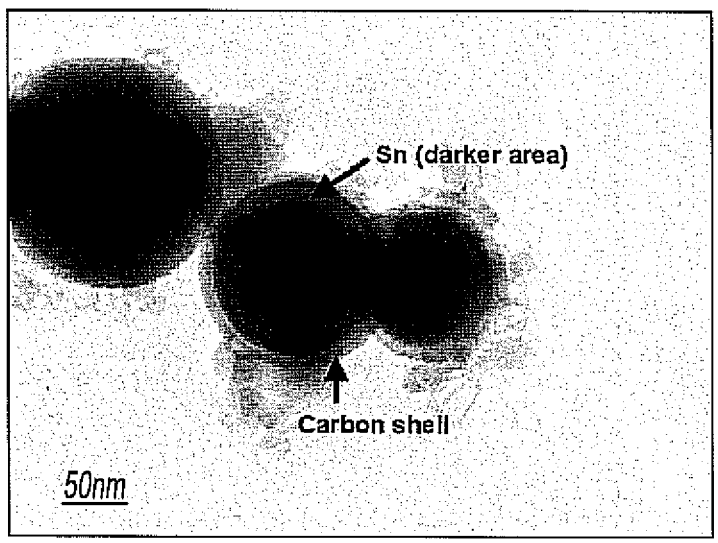
FIG. 8 is a TEM image of an outer carbon shell on a sacrificial material.

FIG. 6 provides a schematic representation of an apparatus for producing the core-shell structured nanoparticles at reference numeral 30. As shown in this figure, an aerosol gas 300 passes through an inlet tube 310 into a precursor container 320 that contains a precursor 322. Flow of the aerosol gas 300 into the precursor container 320 at a sufficient flow rate results in the suspension of the precursor 322 within the aerosol gas 300 to produce an aerosol. The precursor 322 can contain core material and shell material. The precursor 322 can also contain elements that are not incorporated within the core and/or shell of any core/shell structured nanoparticles that are produced, but may be present to assist in the overall process in some manner.

After the aerosol has been produced, it can pass or flow through the exit tube 330 with at least part of the exit tube 330 passing into a plasma torch 340. In some instances, the exit tube 330 has a ceramic portion 332 that terminates generally in the middle of a waveguide 360. The waveguide 360 is used to couple microwave energy to the plasma torch 340. Also included can be a plasma gas 350 which passes within the plasma torch 340, but exterior to the ceramic portion 332 of the exit tube 330 which has the aerosol passing therethrough. Upon focusing microwave energy with the waveguide 360 onto the plasma torch 340, a plasma can be generated with a hot zone 342 located within the plasma torch 340. As the aerosol with the precursor 322 passes through the hot zone 342 of the plasma torch 340, the temperature of the hot zone 342 is such that at least part of the precursor 322 is vaporized. The vaporized precursor 322 exits the hot zone 342 of the plasma torch 340 and enters into a chimney region 370. Upon exiting the hot zone 342, the atoms of the vaporized precursor condense into solid particles.

If the precursor 322 contains a core material and a shell material, the passing or flowing of the aerosol through the hot zone 342 of the plasma torch 340 results in the vaporization of at least part of the core material and at least part of the shell material. Thereafter, the core and shell material atoms condense into core-shell structured nanoparticles. The core-shell structured nanoparticles can be collected from a particle filter 390, from the interior side walls of the chimney region 370 and/or from a particle trap (not shown).

After the core-shell structured nanoparticles have been collected, they can be placed within an acidic or alkaline bath. The acid or acid or alkaline bath comes into contact with the sacrificial material or inner core and results in dissolution thereof. As such, hollow carbon spheres are produced.

In order to better illustrate an embodiment of the present invention, an example of a process wherein hollow carbon spheres were produced is provided below.

EXAMPLE 1

With reference to FIG. 6, dry precursor powders were provided by hand grinding a mixture of micrometer tin particles with crystalline anthracene particles to produce the dry precursor powder 322. The weight ratio of tin to anthracene was 50:1, the tin particles had an average diameter of 50 microns and the mixture of tin particles and anthracene crystals was hand ground until the product appeared fully homogeneous. The dry precursor powder 322 was placed within the precursor powder container 320. Argon with a flow rate of 200 cubic centimeters per minute (cc/min) at standard temperature and pressure (STP) was used for the plasma gas 350 and was passed through the plasma torch 340.

In order to produce an aerosol containing the dry precursor powder 322, argon with a flow rate of 300 cc/min at STP was used as the aerosol gas 300 and allowed to pass or flow into the precursor powder container 320. Upon flowing into the precursor powder container 320 and subsequently exiting therefrom through the exit tube 330, the aerosol gas 300 had tin particles and anthracene particles from the dry precursor powder 322 suspended therein, thereby producing an aerosol. The aerosol containing the tin and anthracene particles exited the ceramic portion 332 of the exit tube 330 and entered the hot zone of the plasma generally at the middle of the waveguide section 360. The waveguide section 360 coupled microwave energy to the plasma torch 340 such that an absorbed power of approximately 900 watts was present. In this example, the plasma torch was made from a quartz tube. The plasma itself was confined within the quartz torch 340 and the residence time of the plasma gas and the aerosol was relatively short, for example less than 1 second. Thereafter, new particles passed from the hot zone to an afterglow region and finally to a zone that was at near ambient temperature. Using these parameters, core-shell structured nanoparticles having a tin core and a carbon shell with a mean nanoparticle diameter of 50 nanometers and a relatively tight size distribution were produced. FIG. 7 illustrates such a nanoparticle generally at reference numeral 210, the core-shell structured nanoparticle 210 having an inner core 212 and an outer shell 214. FIG. 8 shows a transmission electron microscopy (TEM) image of actual tin core-carbon shell nanoparticles produced using the parameters disclosed above.

After the core-shell structured nanoparticles were produced, the sacrificial material of the inner core was removed by using a dissolution method as disclosed in U.S. Pat. No. 3,986,970, which is incorporated herein by reference in its entirety.

Although the above example produced tin-carbon nanoparticles, it is appreciated that other precursor powder materials can be used to produce other core-shell structured nanoparticles, for example and for illustrative purposes only, aluminum micron-sized particles and anthracene can be used as precursor materials to produce aluminum-carbon nanoparticles.

EXAMPLE 2

Figure 9:
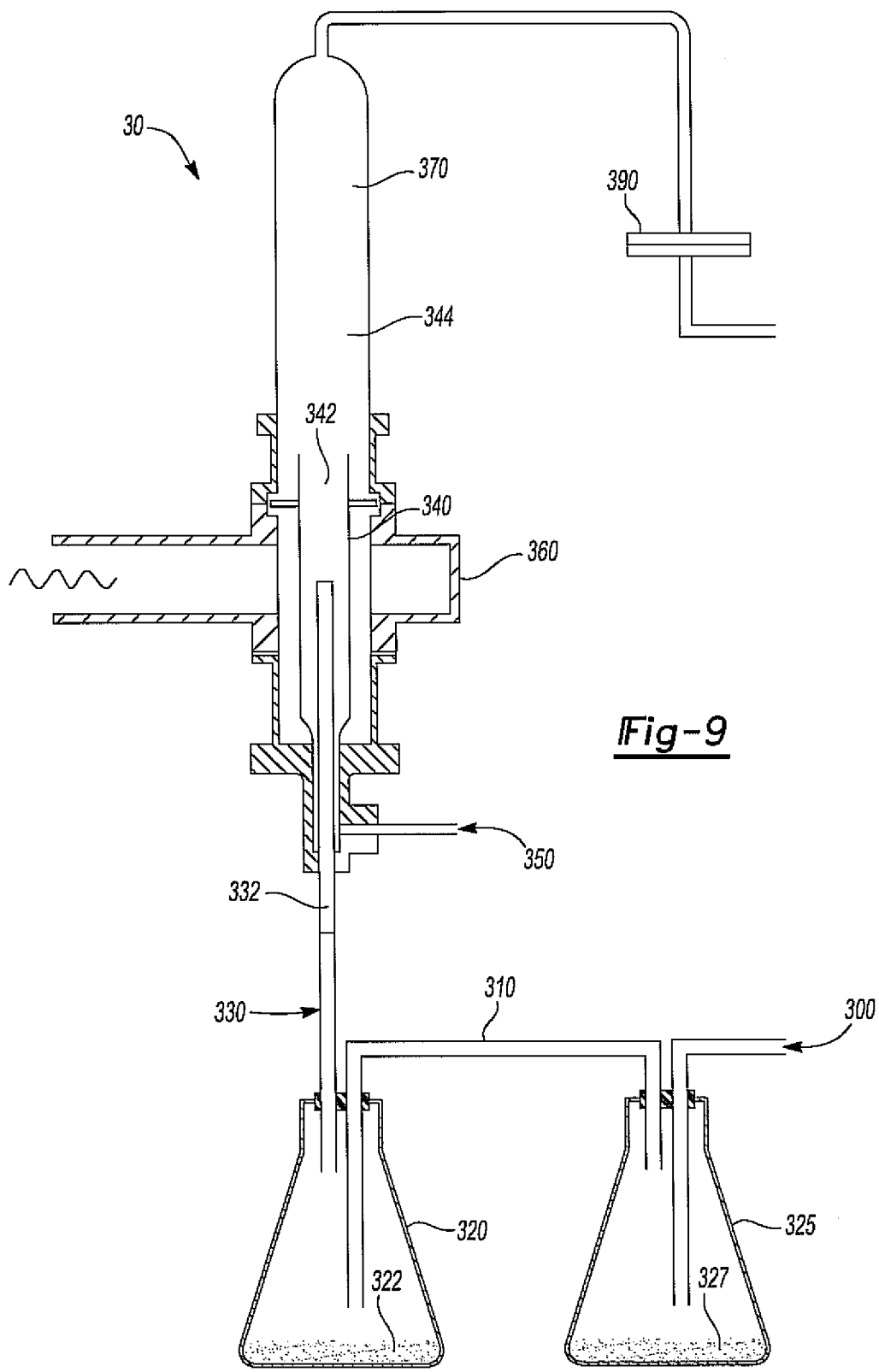
FIG. 9 is a schematic illustration of an apparatus for forming a core material encapsulated by carbon.

With reference to FIG. 9 wherein like numerals correspond to like elements referenced in FIG. 6, dry precursor powders were provided as described above for Example 1, in addition to a liquid carbon source 327 in the form of hexane ($C_6H_{14}$) and/or its vapor. It is appreciated that hexane is a colorless liquid at room temperature, melts at −95° C., boils at 69° C. and has a vapor pressure of 132 mmHg at 20° C. and 1 atmosphere pressure. It is further appreciated that other liquid carbon sources and other methods of incorporating liquid drops and/or its vapor into an inert gas (e.g. ultrasonic vibration of hexane to produce a direct hexane aerosol) can be used within the scope of the present invention.

As illustrated in FIG. 9, the liquid carbon source 327 was placed in a container 325 with an aerosol gas 300 flowing into the container 325 and above the source 327 before exiting the container 325. In this manner, vapor of the carbon source is suspended in the aerosol gas 300 as it flowed out of the container 325 and towards the container 320. For this particular example, approximately 900 watts of absorbed power was present at the plasma torch 340 argon was used as the plasma and aerosol gases. In addition, flow rates of 250 cc/min for the plasma gas 350, 30 cc/min for the aerosol gas 300 and 160 cc/min for the aerosol gas 300 afforded tin core-carbon shell nanoparticles.

Figure 10:
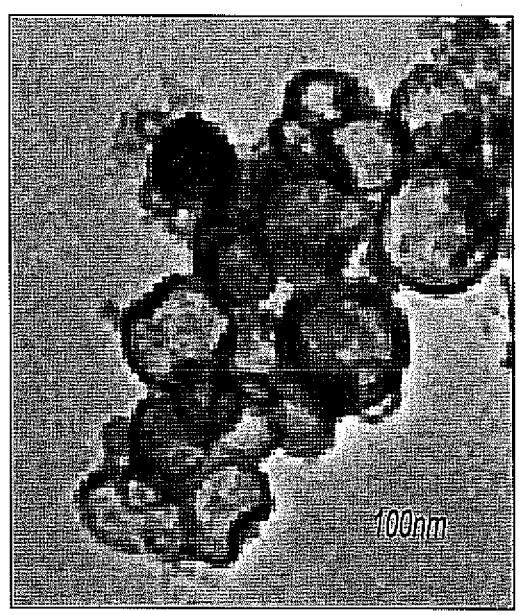
FIG. 10 is a TEM image of hollow carbon spheres.

After the core-shell structured nanoparticles were produced, the sacrificial material was removed as described in the previous example with FIG. 10 showing a TEM image of hollow carbon spheres produced in this manner.

It is appreciated that the present invention is not bound by or to specific flow stream rates, compositions or configurations. In addition, even though the above examples disclose a method having a dual gas flow system with each gas flow having a different overall composition and only joining and mixing at the plasma hot zone, other gas flow and/or plasma systems are included within the scope of the present invention. For example and for illustrative purposes only, a method using a direct current (DC) discharge plasma having a one flow gas system wherein an aerosol gas and a plasma gas are one in the same is within the scope of the disclosed inventive method. This method would result in all of the gas that flows through the plasma and the precursor being well mixed before reaching the hot zone, as opposed to the two gas flow system wherein the aerosol gas and the plasma gas mix with each other in the center of the hot zone as described in the examples above.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

REFERENCES

1. Yujie Xiang, Yi Xie, Zhengquan Li, Changzheng Wu and Rang Zhang, *Chem, Commun.*, Royal Society of Chemistry, 2003, 904-905.
2. Wu Zhang, Jianwei Liu, Zhen Huang, Dekun Ma, Jianbo Liang, and Yitai Qian, *Chemistry Letters*, The Chemical Society of Japan, 2004, Vol. 33, No. 10, 1346-1347.
3. Fabing Su, X. S. Zhao, Yong Wang, Likui Wang and Jim Yang Lee, *J. Mater. Chem.*, Royal Society of Chemistry, 2006, 16, 4413-4419.
4. Zhenhai Wen, Qiang Wang, Qian Zhang, Jinghong Li, *Electrochemistry Communications*, Elsevier, 2007, 9, 1867-1872.
5. Jonathan Phillips, Toshi Shiina, Martin Nemer and Kelvin Lester, *Langmuir* 22, 2006, 9694.
6. Jonathan Phillips, Martin Nemer and John Weigle U.S. Patent Application Publication No. 2006/0198949, USPTO, published Sep. 7, 2006.

We claim:

1. A process for making a hollow carbon sphere comprising:
   providing a sacrificial material for the inner core of material;
   vaporizing carbon with a plasma to form carbon vapor;
   depositing carbon onto the inner core of material by condensation of the carbon vapor onto the sacrificial material in order to form a carbon shell; and
   removing the inner core of material in order to produce a hollow carbon sphere, the hollow carbon sphere having:
      a carbon shell having a volume;
      an inner core having an inner free volume;
      a total volume equal to said volume of said carbon shell plus said inner free volume;
      said inner free volume being at least 25% of said total volume;
      said hollow carbon sphere having a nominal diameter between 10 and 180 nanometers and having a wall thickness between 5 and 20 nanometers.

2. The process of claim 1, wherein the depositing carbon onto the sacrificial material is selected from the group consisting of depositing by chemical vapor deposition, depositing by laser ablation, depositing by electric arc discharge and depositing by low temperature solvation.

3. The process of claim 1, wherein removing the inner core of material is by acidic dissolution of the inner core material.

4. The process of claim 1, wherein removing the inner core of material is by alkaline dissolution of the inner core material.

5. The process of claim 1, further including encapsulating a biologically active material within the hollow carbon sphere.

6. The process of claim 1, further including depositing a catalytic material onto a surface of the hollow carbon sphere.

7. The process of claim 6, wherein the surface of the hollow carbon sphere is an outer surface of the hollow carbon sphere.

* * * * *